(12) United States Patent
Cunningham et al.

(10) Patent No.: US 8,426,733 B1
(45) Date of Patent: Apr. 23, 2013

(54) CONDUIT MANAGEMENT DEVICE

(75) Inventors: W. Brian Cunningham, Westborough, MA (US); Jeffrey M Lewis, Maynard, MA (US); Ilhan Gundogan, Lexington, MA (US); Gerald J Cote, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 530 days.

(21) Appl. No.: 12/494,912

(22) Filed: Jun. 30, 2009

(51) Int. Cl.
*H01B 7/36* (2006.01)

(52) U.S. Cl.
USPC .......................................................... 174/112

(58) Field of Classification Search .................. 174/92, 174/93, 94 R, 94 S, 36
See application file for complete search history.

(56) References Cited

U.S. PATENT DOCUMENTS

| | | | | |
|---|---|---|---|---|
| 3,212,207 A * | 10/1965 | Searing | | 40/316 |
| 4,656,767 A * | 4/1987 | Tarrant | | 40/316 |
| 6,777,618 B2 * | 8/2004 | Bond et al. | | 174/112 |
| 6,843,008 B2 * | 1/2005 | Mellgren | | 40/316 |
| 7,612,288 B1 * | 11/2009 | Gundogan et al. | | 174/112 |

* cited by examiner

*Primary Examiner* — William Mayo, III
(74) *Attorney, Agent, or Firm* — Krishnendu Gupta; Konrad R. Lee

(57) ABSTRACT

A gangable conduit management device includes a body for housing a conduit, the body having an interior portion for receiving the conduit, an exterior portion having a first connection device on a first side thereof and a second connection device on a second side thereof and retention means for retaining the conduit within the body. The first connection device includes a male connector portion and the second connection device includes a female connector portion.

13 Claims, 14 Drawing Sheets

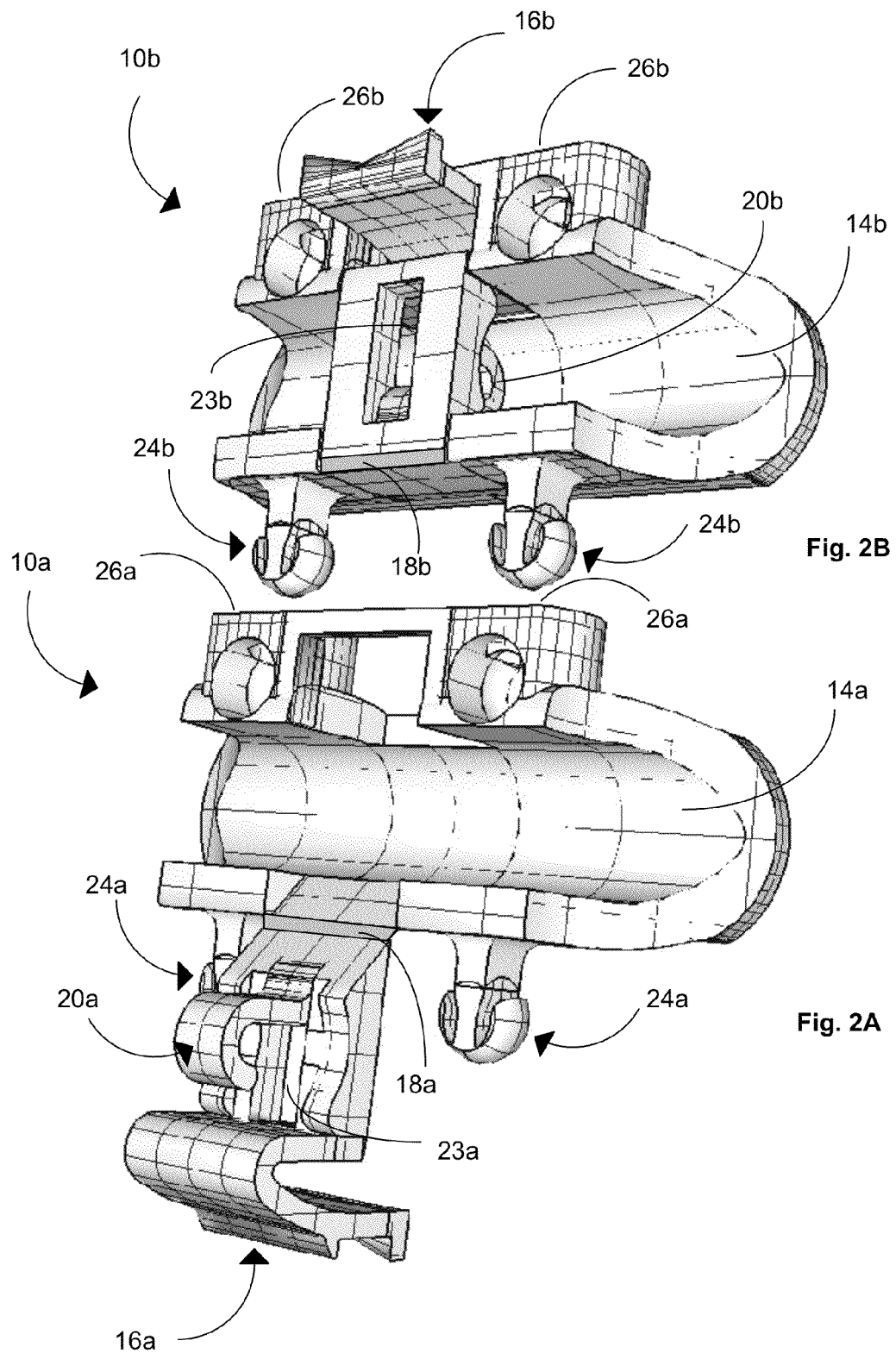

CONDUIT MANAGEMENT DEVICE

FIELD OF THE INVENTION

The present invention is directed generally to an apparatus for organizing and identifying a conduit or multiple conduits and, more particularly, to a device for connecting and managing cables used in electronic systems.

BACKGROUND OF THE INVENTION

Many electrical systems are comprised of devices that are interconnected via electronic cables. These cables may be used to provide electric power to the systems, or may carry data to and from the systems. In a data storage array system, for example, the individual components within that array may be interconnected by Ethernet or fiber optic data cables, and that array may be connected to other arrays via similar cables. The individual cables in these systems may look similar to one another, may be numerous in quantity, may run in the same direction and connect to an array of ports on a device in a relatively tight space. Often, a need arises to temporarily disconnect, or replace one or more of these cables, to perform a system upgrade or repair, for example. A device that organizes and identifies where these cables were previously connected can be useful in restoring the system back to the proper state upon completion of the upgrade or repair.

Conventional methods of managing these cables may, at their simplest, involve the application of identifying labels to the cables exterior surface once the conduits are initially installed in the system. Another method used to manage these cables is to gather the cables in groups using a cable management device. The cable management device that bundles the cables in this fashion would have a predetermined number of locations or slots to receive the cables of predetermined size. Organizing the cables in this manner can help a user identify, by group, which cables were connected next to each other on a particular area of the system, and in which order (from left to right for example). A disadvantage to such a device is that it is not ideal for applications where the user requires more, or fewer, conduits than the predetermined number of locations provided on that cable management device. A cable management device that has four total slots, for example, would allow one to manage up to four cables, and so might have empty or blank slots if the user did not require four cables for the application. Similarly, using the example above, a user with five total cables would then have to split the desired cable group into at least two smaller groups to make room for the fifth cable. An additional disadvantage to the prior art is that it is not flexible to cables of varying size. For example, in the prior art, the user would not have the flexibility to manage several cables of one diameter, and several cables of a vastly different diameter using the same cable management device. Instead, using the prior art method, two different cable management devices each specifically designed for the cables of the particular size would be required, thus forcing a grouping by size rather than how they are being installed in the system.

SUMMARY OF THE INVENTION

A gangable conduit management device is disclosed that allows the user to identify and organize electrical cables present in data storage arrays. Each conduit management device can provide a labeling surface, and can receive one or more cables of varying sizes. The conduit management device has a retention mechanism that prevents the device from sliding along the cable. The exterior surface of the conduit management device is designed with connection features so that it can be connected to neighboring cable management devices on either side, allowing the cables to be organized in groups or "ganged" as they are installed in the system. The grouping of cables in this fashion allows the user to more efficiently and accurately service the data storage array, by providing a means of insuring consistency in the connections of the cables. The gangable nature of the conduit management device allows a user to easily remove cables from the group if they become unnecessary in the application by disconnecting the conduit management device from adjacent devices. Similarly, the user can add additional cables to the group by attaching additional conduit management devices.

BRIEF DESCRIPTION OF THE DRAWINGS

These and other features will become more readily apparent from the following detailed description when read together with the accompanying drawings, in which:

FIGS. 2A and 2B are perspective views of a conduit management device having its conduit retention mechanism in the open position, and a conduit management device having its conduit retention mechanism in the closed position, in accordance with the present invention;

DETAILED DESCRIPTION

The present invention addresses problems with conduit management devices in the prior art, with a device that provides the user increased flexibility and granularity with respect to conduit quantity and conduit size.

Figure 1:
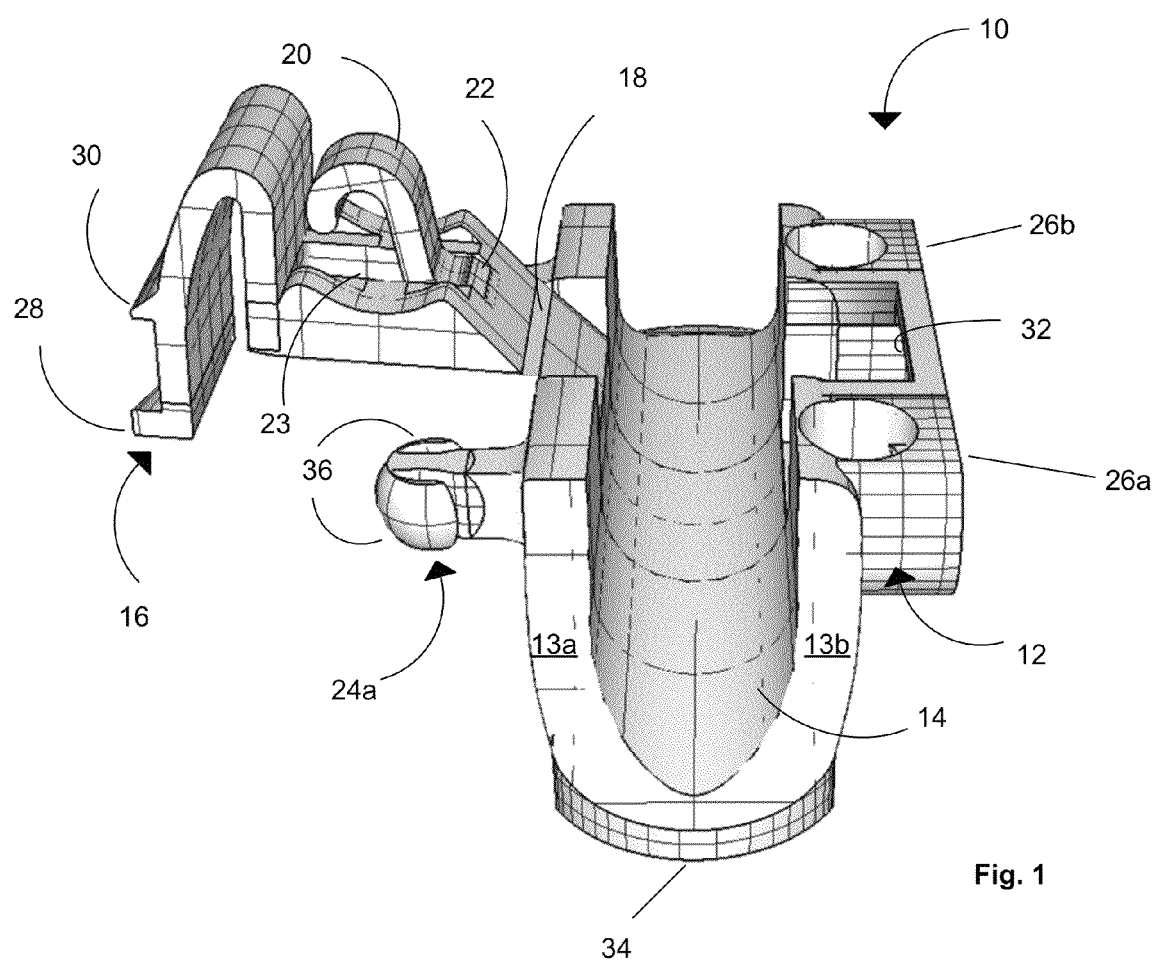
FIG. 1 is a perspective view of a single conduit management device in accordance with the present invention.

Shown in FIG. 1 is a single conduit management device 10. In one embodiment, conduit management device 10 is molded into a single piece from a material such as polypropylene, which enables the device 10 to be rigid, but also flexible where needed. It will be understood that any material that enables the device 10 to operate in the manner described may be used in the fabrication of the device.

Conduit management device 10 includes a body portion 12, which is generally U-shaped to form a channel 14 between sides 13a and 13b of body portion 12. Device 10 includes a conduit retention mechanism 16 shown in its open position, which is attached to body portion 12 via a molded hinge 18 to side 13a. Retention mechanism 16 has a retention spring device 20, attached to retention mechanism 16 via a flex point 22, that can travel in and out of relief slot 23, and that exerts pressure against the installed conduit (not shown in FIG. 1), such that the device 10 is adequately secured to the installed conduit to prevent it from sliding. The operation of spring device 20 is described in greater detail below with reference to FIGS. 5A-5E. Mechanism 16 further includes locking mechanism having a tab 28 and a barb 30. As described below, when conduit retention mechanism 16 is rotated about its hinge 18 to retain an installed conduit (not shown in FIG. 1), the barb 30 engages a ridge 32 on side 13b of the device 10, providing the conduit retention mechanism 16 a means of maintaining the closed position.

Device 10 further includes male connectors 24 (one of which is not visible in FIG. 1) attached to side 13a and female connectors 26 attached to side 13b. In this embodiment, male connectors 24 are a ball device and female connectors 26 are sockets into which the ball devices are inserted. As shown in FIG. 1, male connector 24 includes flexible wings 36, which are able to deflect when inserted into sockets 26 to provide a secure connection between devices. In an alternative embodiment, male connectors 24 are solid balls and sockets 26 can have flexible walls therein which are able to deflect when a male connector 24 is inserted into a socket 26 to provide a secure connection between devices.

FIG. 2A depicts two devices (10a and 10b), as described with respect to FIG. 1. Devices 10a and 10b are positioned beside one another, each with no conduits installed. The conduit retention mechanism 16b of device 10b has been rotated approximately 180 degrees upon its hinge 18b into the closed position, illustrating how it would close over a conduit (not shown in FIG. 2B) that would be installed in the device's channel 14b. The device 10a is shown with two male connectors 24a on one side 13a (FIG. 1) of the exterior surface and two female connectors 26a on the opposite side 13b (FIG. 1.) of the exterior surface.

Figure 3C:
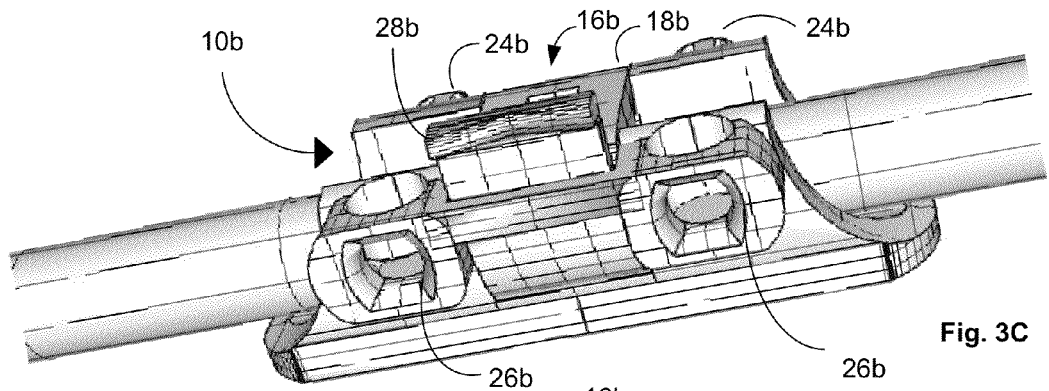
FIGS. 3A-3C are perspective views of a conduit management device with a cable installed and its conduit retention mechanism in the open position, and multiple views of a conduit management device with a cable installed and its conduit retention mechanism in the closed position, in accordance with the present invention.
Figure 3B:
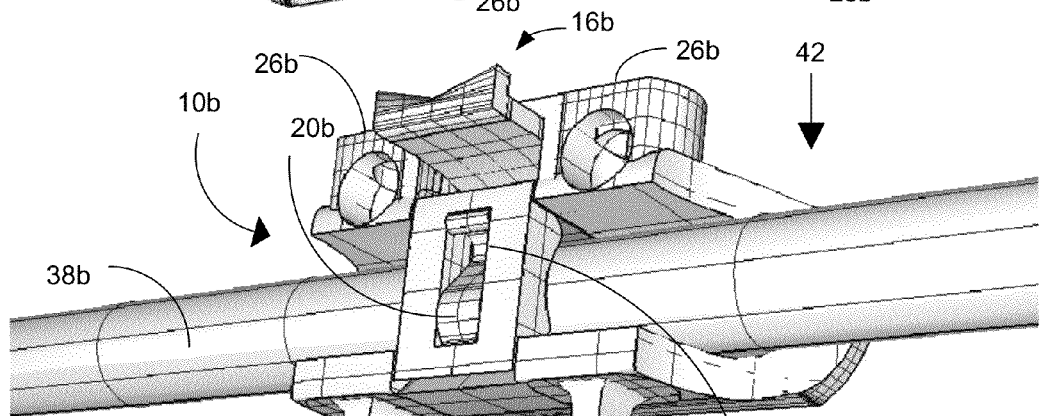
Figure 3A:
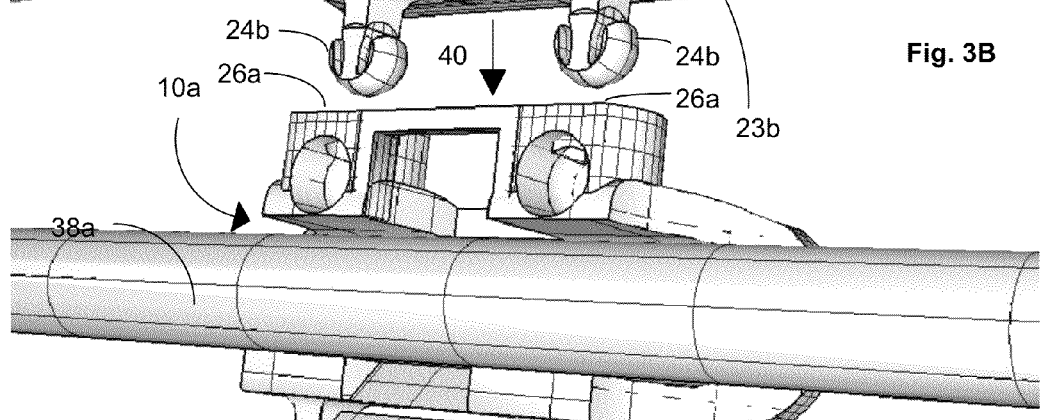

Interconnection of devices 10a and 10b is achieved by first aligning, then inserting, in the direction of arrow 40 of FIG. 3B, male connectors 24b of device 10b to corresponding female connectors 26a of device 10a of FIG. 3A.

FIG. 3A again shows devices 10a and 10b from FIG. 2, but each with a single conduit 38a and 38b installed in each of the inner surface conduit channels 14a and 14b, respectively. While conduit 38a is installed in device 10a, the conduit retention mechanism 16a of that device is still in the fully opened position. FIG. 3B shows device 10b positioned beside device 10a, with a conduit 38b installed, but with its conduit retention mechanism 16b in the fully closed position. This illustrates how the device 10b is secured tight against the conduit 38b, due to the pressure that retention spring device 20b exerts upon the conduit 38b. Relief slot 23b provides spring retention feature 20b room for displacement that can vary based on the size of conduit 38b. In other words, with smaller diameter cables in channel 14, the spring device 20 will deflect less into slot 23 than it would in the case of a larger diameter cable. By allowing spring device 20 to deflect as necessary into slot 23, cables of varying diameters can be retained in device 10 by retention mechanism 16.

Figures 4A, 4B:
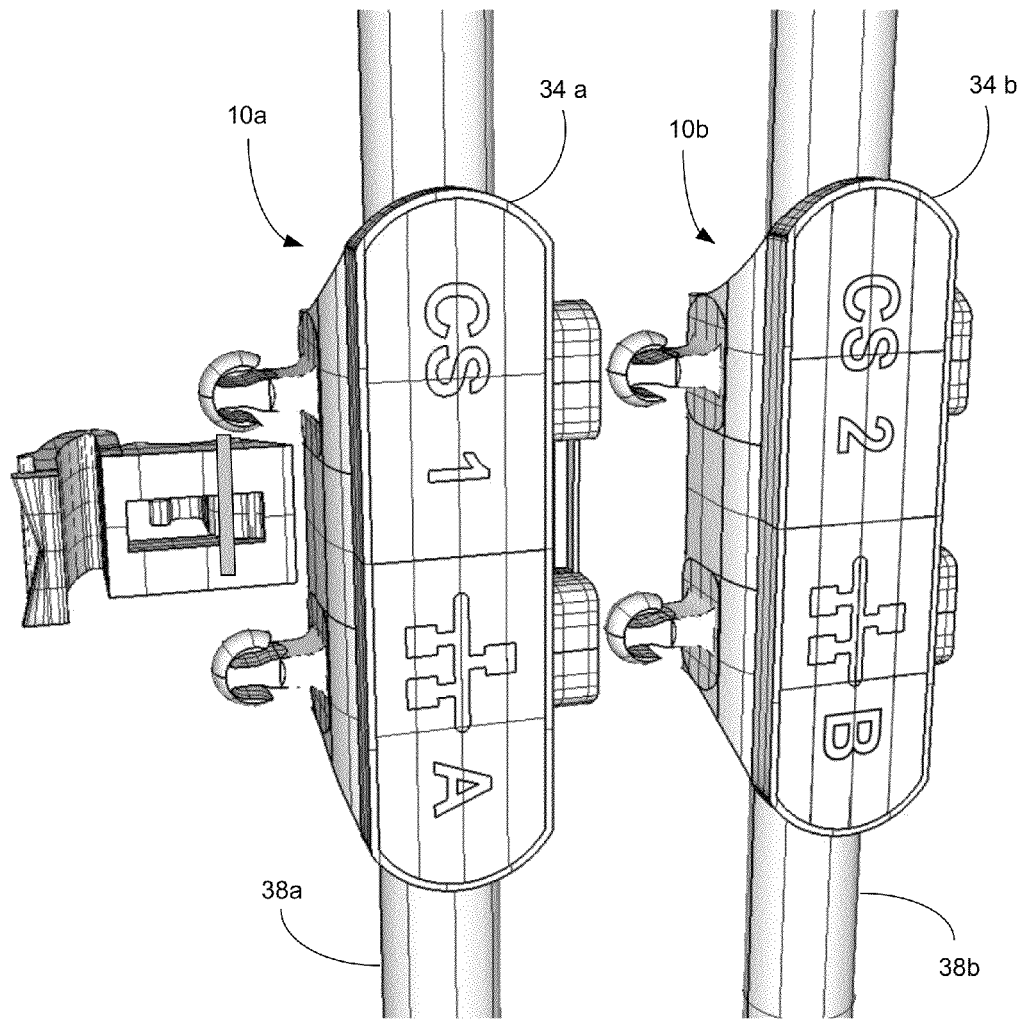
FIGS. 4A and 4B are perspective views of labeling surfaces of open and closed conduit management devices in accordance with the present invention.

FIG. 4A and FIG. 4B show a view from the opposite side of that shown in FIGS. 3A and 3B, illustrating the labeling surfaces 34a and 34b provided on the cable management devices 10a and 10b of FIG. 2. These labeling surfaces allow the user to identify the conduit onto which each conduit management device is attached before or after the devices 10a and 10b have been installed over the conduits 38a and 38b, respectively. The labeling surfaces 34a and 34b can include various identification indicia and are designed such that they can receive identifying information, such as silk-screened text, ink markings, and or adhesive backed pre-printed label/s. The design does not preclude molding into the device surface the desired label content (i.e. text, symbols etc. . . . ).

Figure 5A:
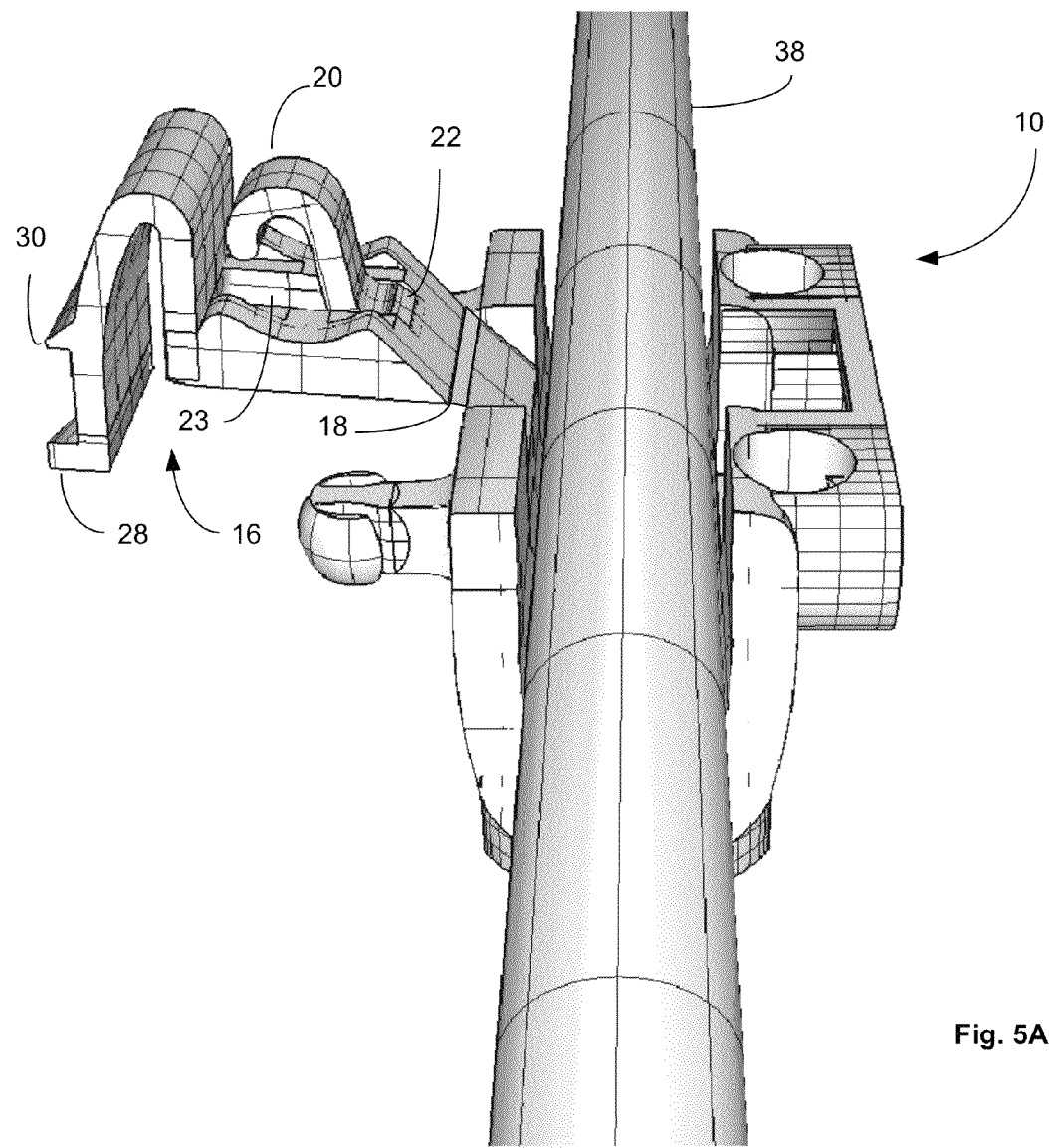
FIGS. 5A-5E are perspective views of a single cable management device with a cable installed, showing the operation of the conduit retention mechanism as the device is transitioned from an open position to a closed position in accordance with the present invention.
Figure 5B:
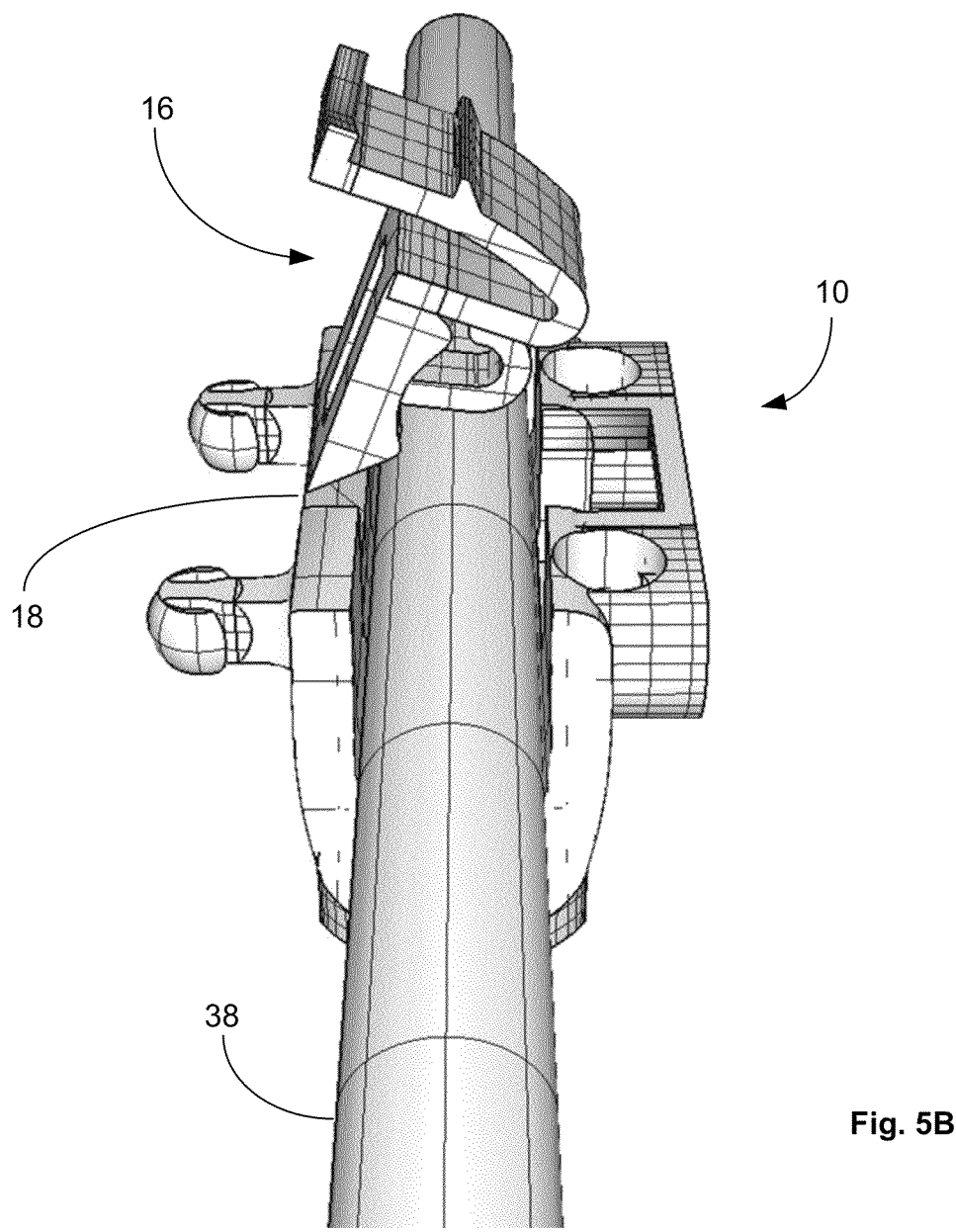
Figure 5C:
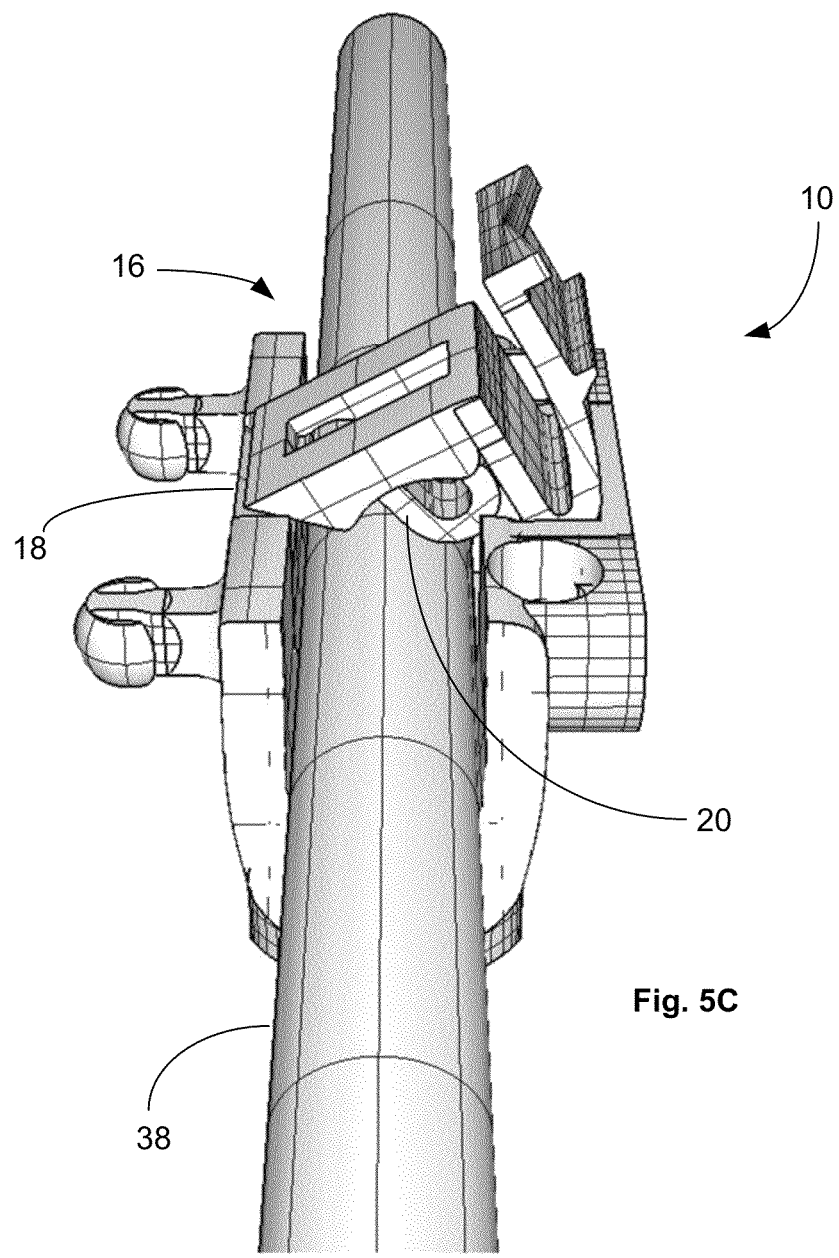
Figure 5D:
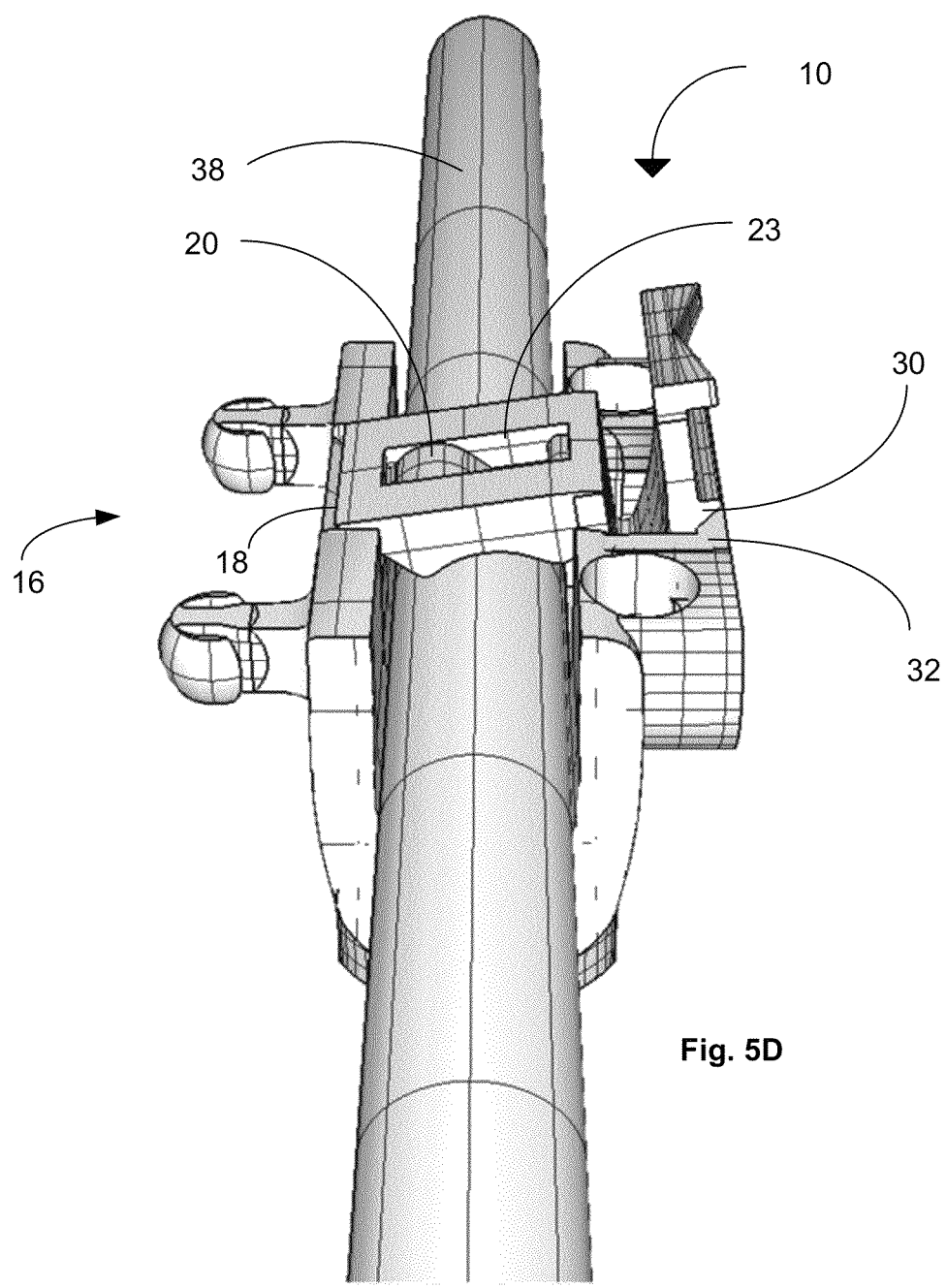
Figure 5E:
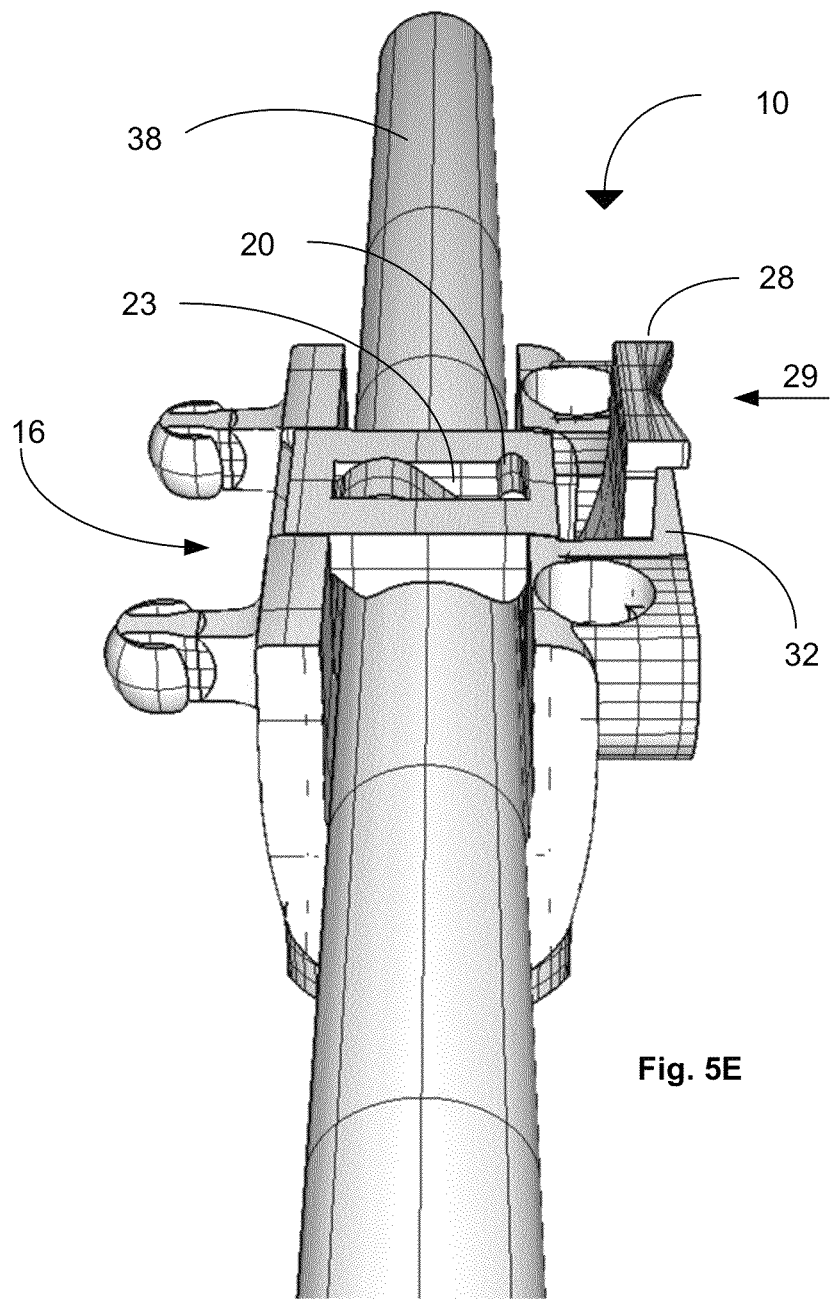

FIGS. 5A through 5E illustrate the operation of the retention mechanism 16 of conduit management device 10 as it is attached to conduit 38. FIG. 5A shows device 10 with conduit retention mechanism 16 in the fully opened position, including hinge 18, a retention spring device 20, relief slot 23, tab 28 and barb 30. FIG. 5B shows device 10 with cable retention mechanism 16 rotated upon its hinge 18 to a partially closed position. FIG. 5C shows the cable retention mechanism 16 closed further still, with retention spring device 20 just coming into contact with conduit 38. FIG. 5D shows the conduit retention mechanism 16 almost fully closed and the retention spring device 20 being displaced upward, through relief slot 23 in the conduit retention mechanism 16. Barb 30 of mechanism 16 begins contact with ridge 32. Finally, FIG. 5E shows the cable retention device in the fully closed position, with barb 30 (not visible in FIG. 5E) retained underneath ridge 32, and retention spring device 20 exerting pressure on conduit 38 to secure the conduit management device 10 to the conduit 38. To open retention mechanism 16 to remove the conduit management device 10 from the conduit 38, tab 28 of retention mechanism 16 is pressed in the direction shown by arrow 29, to release the barb 30 (not shown in FIG. 5E) from ridge 32.

As shown in FIGS. 5A-5E, retention spring device 20, in combination with relief slot 23, enable the device 10 to accommodate conduits of varying sizes. Smaller diameter conduits will cause retention spring device 20 to deflect into relief slot 23 less than larger diameter conduits. However, the retention spring device 20 is configured to exert sufficient pressure on the conduit to prevent the device from easily sliding along the conduit. This further enables device 10 to accommodate multiple smaller diameter conduits in a single device.

Figure 6:
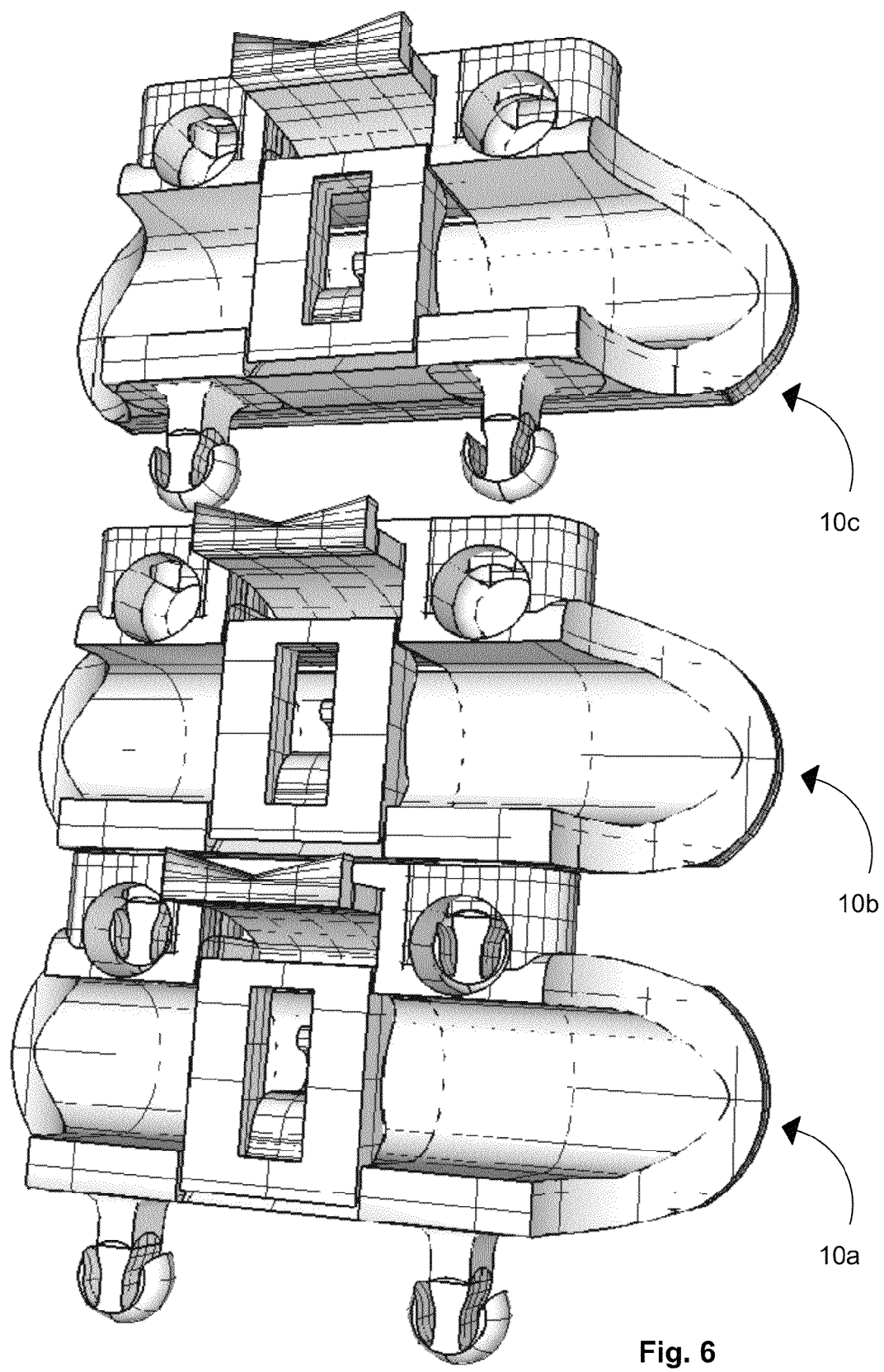
FIG. 6 is a perspective view of three conduit management devices, showing two devices ganged together, with the third in position to be connected to the ganged pair of devices in accordance with the present invention.

FIG. 6 shows devices 10a and 10b already ganged together, with a third device 10c positioned so that it can be connected to the existing ganged pair of devices 10a and 10b.

Figure 7:
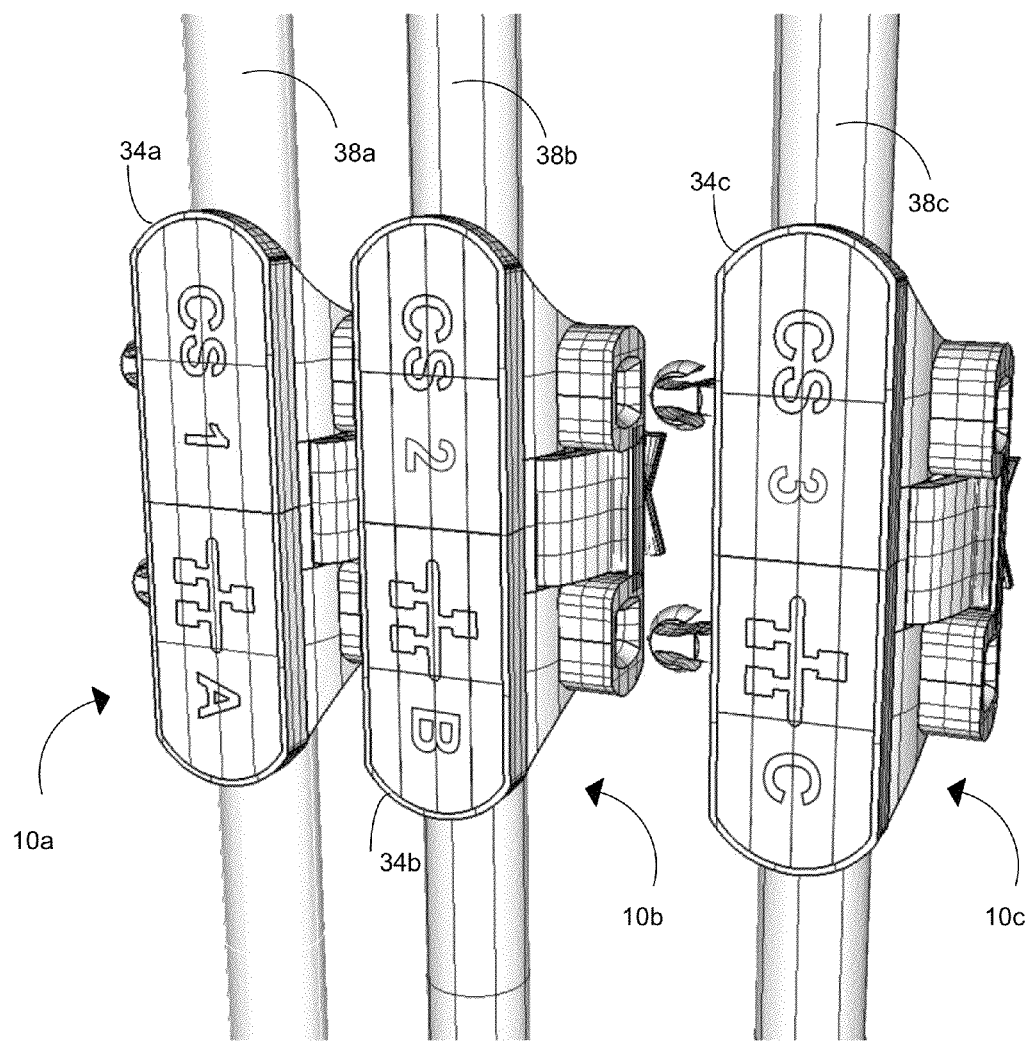
FIG. 7 is another perspective view of three conduit management devices, showing two devices ganged together, with the third in position to be connected to the ganged pair of devices in accordance with the present invention.

FIG. 7 shows a view from the opposite side of that shown in FIG. 6, showing the label surfaces 34a-34c of each devices 10a-10c, and illustrating how a user is provided the flexibility to add an additional cable 38c to the already ganged group of two cables 38a and 38b, by first installing a device 10c on the third cable 38c, and then connecting that device to the ganged pair of devices 10a and 10b.

Figure 8:
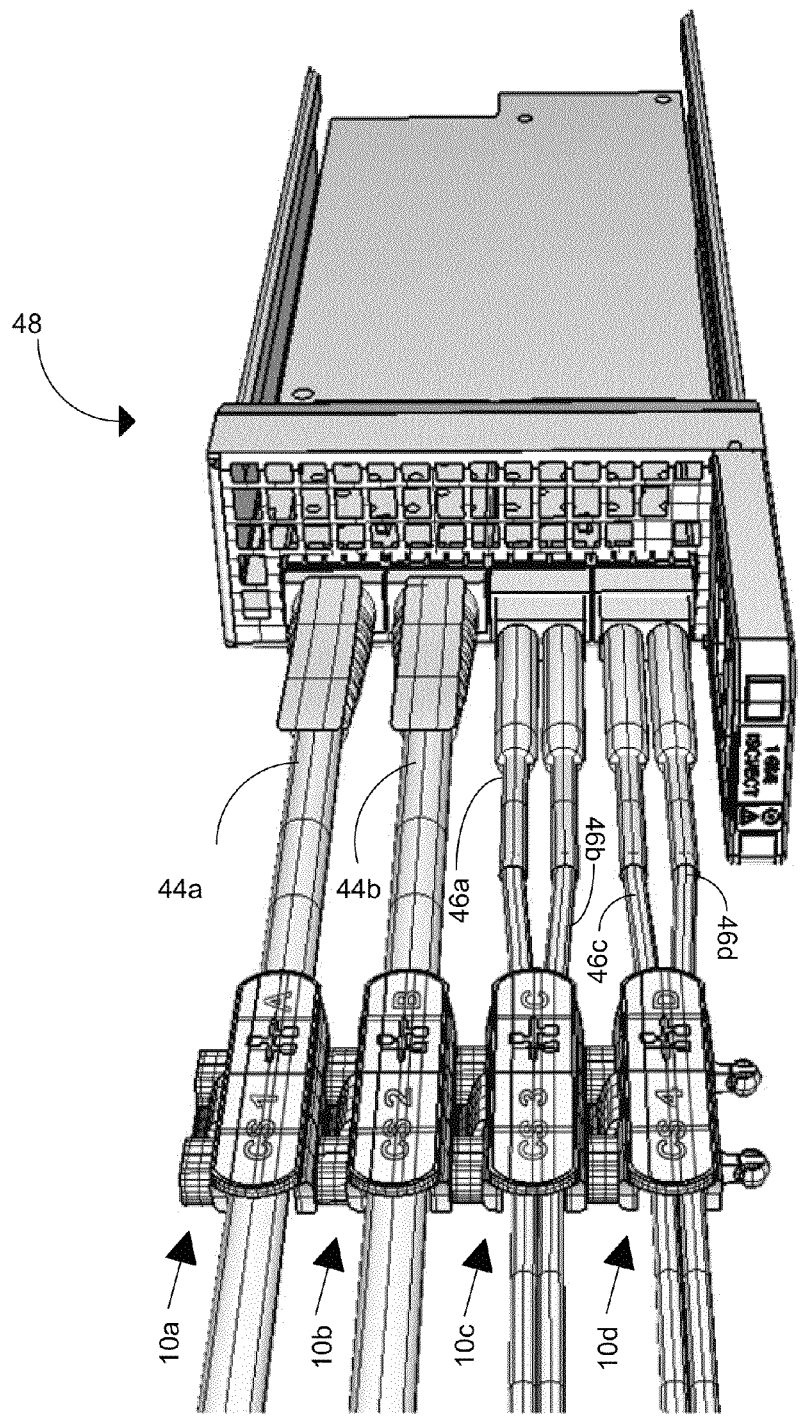
FIG. 8 is a top view of multiple cables of an electronic device ganged together with conduit management devices, in accordance with the present invention.

FIG. 8 shows four devices ganged together (10a-10d), managing a total of 6 cables (44a and 44b, 46a-46d) connected to an electronic device 48. For illustration purposes, devices 10a and 10b are labeled, CS1 and CS2, respectively. These devices are each installed, for example, on larger dimension Ethernet cables 44a and 44b. For illustration purposes, devices 10b and 10c are labeled CS3 and CS4, respectively. These devices are each installed, for example, over pairs of smaller diameter fiber optic cables 46a, 46b and 46c, 46d, respectively. All 6 cables are ganged together via the interconnection of the four devices 10a-10d, by male connectors 24 and female connectors 26, as described above.

Figures 9A, 9B:
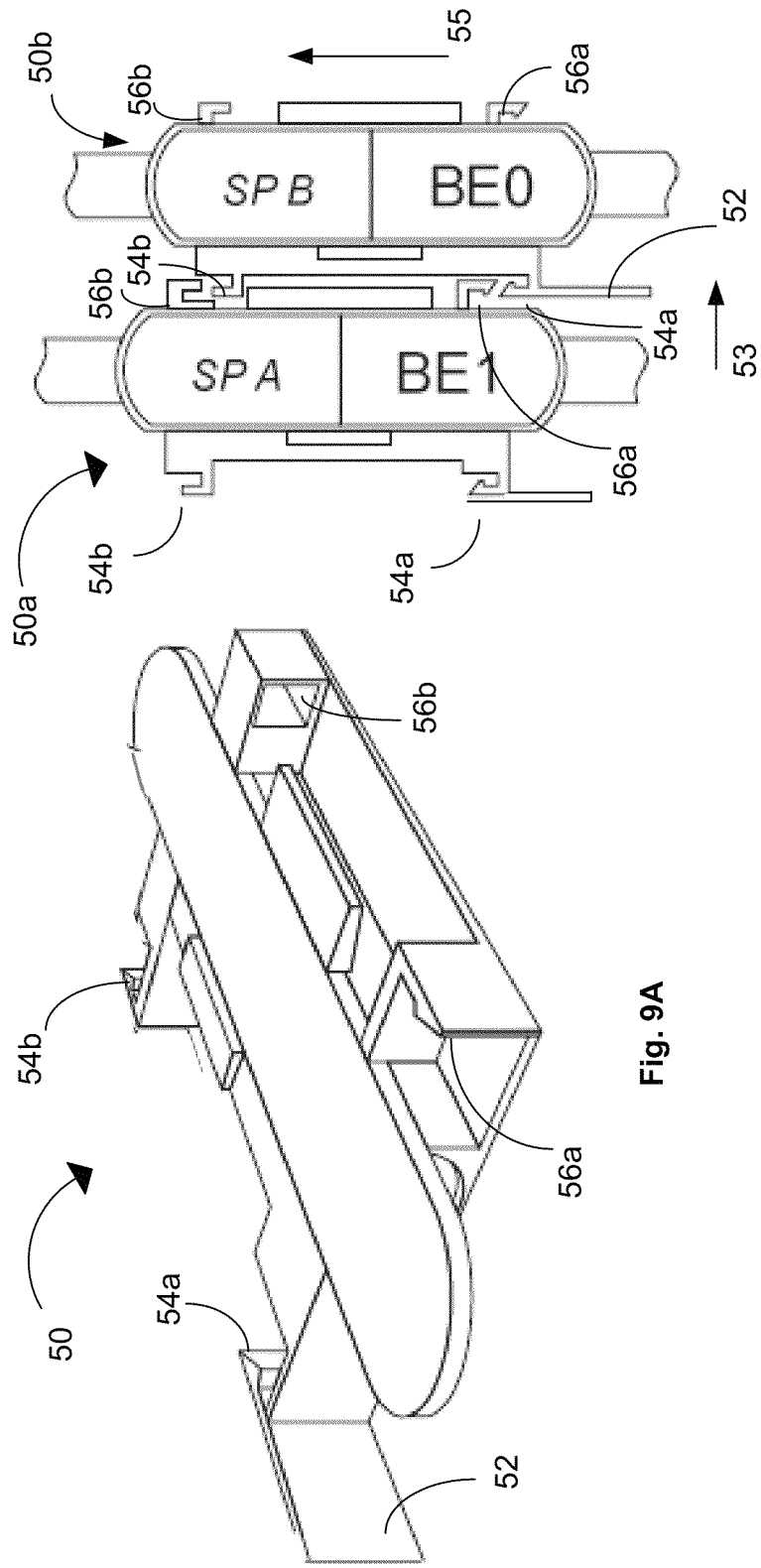
FIGS. 9A and 9B are perspective views of an alternative embodiment of a conduit management device, in accordance with the present invention.

While the male connection features 24a and 24b have been described and illustrated as being ball devices, and the female connection features 26a and 26b have been described and illustrated as being socket devices in this embodiment, it should be understood that any connection features that provide a mated connection between devices 10 is contemplated as reasonable alternatives to this design. Device 50 of FIG. 9A is one example of such an alternate embodiment, with interconnecting points shaped as male interlocking tabs 54a and 54b (FIG. 9B) and female interlocking tabs 56a and 56b (FIG. 9B). Device 50b is connected to device 50a by aligning the devices as shown in FIG. 9B and sliding device 50b in the direction shown by arrow 55 to lock male tabs 54a and 54b of device 50b with female tabs 56a and 56b of device 50a. To unlock the devices, lever 52 is pressed in the direction shown by arrow 53, to release male tab 54a of device 50a from female tab 56a of device 50a, and sliding device 50b in the direction opposite that show by arrow 55.

Figure 10A:
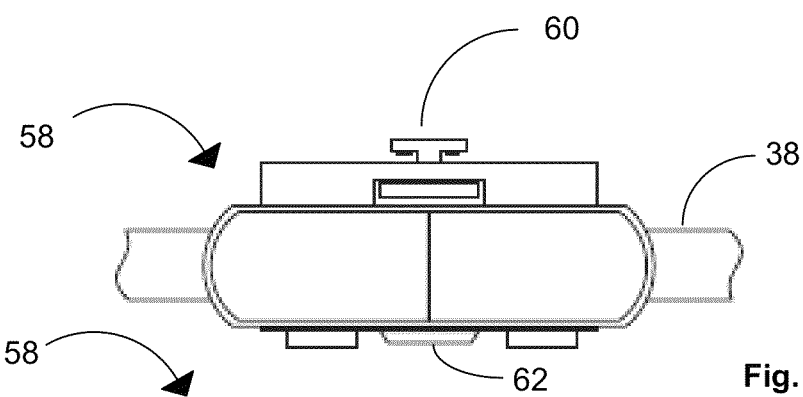
FIG. 10A is a top view and FIGS. 10B-10D are side views of an alternative embodiment of a conduit management device, in accordance with the present invention.
Figure 10B:
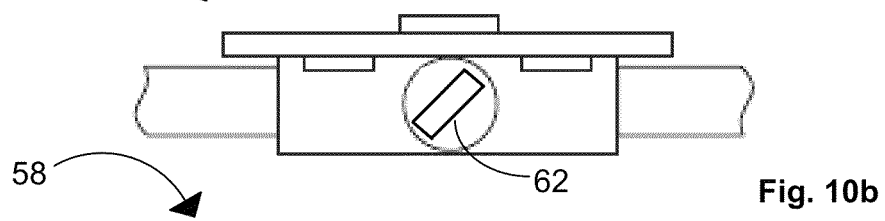
Figure 10C:
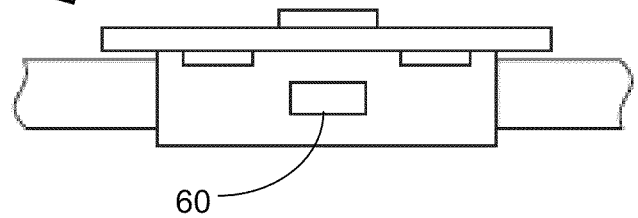
Figure 10D:
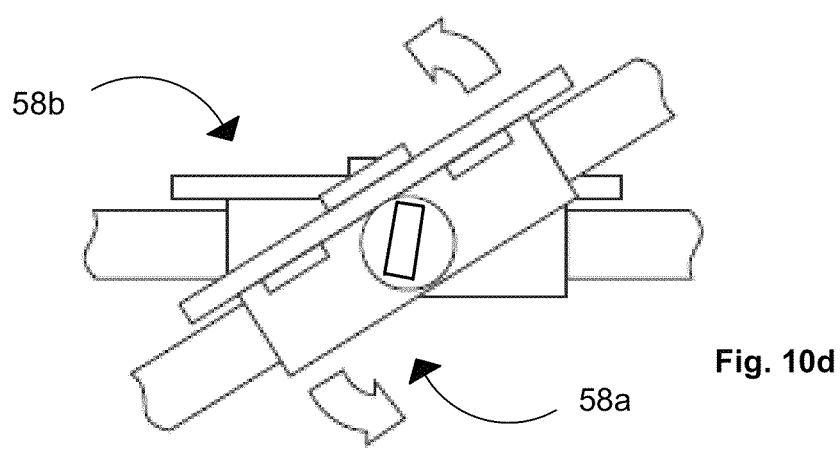

Yet another embodiment is device 58 shown in FIGS. 10A-10C. Device 58 includes a male T-shaped connection tab 60, and female connecting slot 62. As shown in FIG. 10D, to connect devices 58a and 58b, tab 60 of device 58a is inserted into slot 62 of device 58b and device 58b is rotated to align it with device 58a and to lock the devices to each other.

In addition, while the devices 10a and 10b in FIG. 2A and FIG. 2B each illustrate two connection points (i.e. two male balls and two female sockets) per device, it is contemplated that the design could be modified with ease to contain a single connection point, or connection points in excess of two.

Finally, while the conduit retention mechanism 16 of FIG. 1 is shown as integrated and permanently attached via a molded hinge 18, it is contemplated that it can be designed, instead, as an independent and removable mechanism that would be joined to the conduit management device 10 via various other mechanisms such as mechanical interference.

Accordingly, a gangable conduit management device is disclosed that allows the user to identify and organize electrical cables present in data storage arrays. Each conduit management device can provide a labeling surface, and can receive one or more cables of varying sizes. The conduit management device has a retention mechanism that prevents the device from sliding along the cable. The exterior surface of the conduit management device is designed with connection features so that it can be connected to neighboring cable management devices on either side, allowing the cables to be organized in groups or "ganged" as they are installed in the system. The grouping of cables in this fashion allows the user to more efficiently and accurately service the data storage array, by providing a means of insuring consistency in the connections of the cables. The gangable nature of the conduit management device allows a user to easily remove cables from the group if they become unnecessary in the application by disconnecting the conduit management device from adjacent devices. Similarly, the user can add additional cables to the group by attaching additional conduit management devices.

The system may be embodied in other specific forms without departing from the spirit or essential characteristics thereof. For example, although the conduits described and shown have been described as electrical cables used with electronic devices, it will be understood that any type of conduit may be ganged with the conduit management device described herein, such as tubing for transporting fluids, etc. The present embodiments are therefore to be considered in respects as illustrative and not restrictive, the scope thereof being indicated by the appended claims rather than by the foregoing description, and all changes which come within the meaning and range of the equivalency of the claims are therefore intended to be embraced therein.

The invention claimed is:

1. A gangable conduit management device comprising:
a body for housing a conduit, the body including:
an interior portion for receiving the conduit;
an exterior portion having a first connection device on a first side thereof and a second connection device on a second side thereof; and
retention means for retaining the conduit within the body;
wherein the first connection device includes a male connector portion and the second connection device includes a female connector portion;
wherein the retention means is hingedly attached to the body on one side of the channel and, when in a closed position, spans the channel and latches to the side opposite the one side to retain the conduit within the channel; and
wherein the retention means includes a spring projecting into the channel for contacting and for applying pressure to the conduit when in the closed position.

2. The gangable conduit management device of claim 1 wherein the spring is constructed and arranged to enable it to retain conduits of varying diameters within the channel.

3. The gangable conduit management device of claim 1 wherein the conduit retention mechanism includes a relief slot in the side opposite the one channel to receive the spring.

4. The gangable conduit management device of claim 3 wherein the exterior portion further includes a label-receiving portion for enabling the device to be labeled with identification information for the conduit held therein.

5. The gangable conduit management device of claim 4 wherein the conduit comprises an electrical cable.

6. A conduit management system comprising:
a plurality of conduit ganging devices, each including:
a body for housing a conduit, the body including:
an interior portion for receiving the conduit;
an exterior portion having a first connection device on a first side thereof and a second connection device on a second side thereof; and
retention means for retaining the conduit within the body;
wherein the first connection device includes a male connector portion and the second connection device includes a female connector portion;
wherein first and second of the plurality of conduit ganging devices are connected together by inserting the first connection device of the first ganging device into the second connection device of the second ganging device; and
wherein the first connection device includes a male connector portion and the second connection device includes a female connector portion;
wherein the retention means is hingedly attached to the body on one side of the channel and, when in a closed position, spans and has a cantilevered portion projecting into the channel to contact the conduit and latches to the side opposite the one side to retain the conduit within the channel.

7. The gangable conduit management device of claim 6 wherein the interior portion of each device comprises a channel into which the conduit is received.

8. A conduit management device comprising:
a body for housing a conduit, the body including:
an interior portion for receiving the conduit; and retention means having a spring portion projecting into the interior portion for retaining the conduit within the body; and wherein the retention means of each device is hingedly attached to the body on one side of the channel and, when in a closed position, spans the channel and latches to the side opposite the one side to retain the conduit within the channel.

9. The gangable conduit management device of claim 8 wherein the retention means of each device includes the spring portion is cantilevered for applying pressure to the conduit when in the closed position.

10. The gangable conduit management device of claim 9 wherein the spring portion is constructed and arranged to enable it to retain conduits of varying diameters within the channel.

11. The gangable conduit management device of claim 10 wherein the conduit retention mechanism includes a relief slot in the side opposite the one channel to receive the spring.

12. The gangable conduit management device of claim 11 wherein the exterior portion of each device further includes a label-receiving portion for enabling the device to be labeled with identification information for the conduit held therein.

13. The gangable conduit management device of claim 12 wherein the conduit comprises an electrical cable.

* * * * *